United States Patent [19]
Palmer et al.

[11] 3,955,043
[45] May 4, 1976

[54] HIGH VOLTAGE CABLE SPLICE USING FOAM INSULATION WITH THICK INTEGRAL SKIN IN HIGHLY STRESSED REGIONS

[75] Inventors: Philip J. Palmer, Philadelphia; J. Kenneth Wittle, Berwyn, both of Pa.

[73] Assignee: General Electric Co., Philadelphia, Pa.

[22] Filed: Apr. 11, 1974

[21] Appl. No.: 460,236

[52] U.S. Cl. ............................. 174/84 R; 174/21 R; 174/92; 174/110 F
[51] Int. Cl.² ............................................. H01R 5/00
[58] Field of Search ............ 174/76, 88 R, 84, 23 R, 174/110 F, 92, 93

[56] References Cited
UNITED STATES PATENTS

| | | | |
|---|---|---|---|
| 2,256,483 | 9/1941 | Johnston | 174/110 F |
| 2,737,503 | 3/1956 | Sprague et al. | 174/110 F |
| 3,007,203 | 11/1961 | Ammons | 174/110 F |
| 3,064,073 | 11/1962 | Downing et al. | 174/110 F |
| 3,427,393 | 2/1969 | Masterson | 174/110 F |
| 3,499,972 | 3/1970 | Smith | 174/93 |
| 3,582,533 | 6/1971 | Albright et al. | 174/110 F UX |
| 3,790,695 | 9/1972 | Floessel | 174/110 F |
| 3,836,694 | 9/1974 | Kapell | 174/76 X |
| 3,836,702 | 9/1974 | Plummer | 174/92 |

FOREIGN PATENTS OR APPLICATIONS

| | | | |
|---|---|---|---|
| 6,803,179 | 9/1968 | Netherlands | 174/84 R |
| 1,166,861 | 4/1964 | Germany | 174/110 F |
| 1,920,637 | 10/1970 | Germany | 174/88 R |

*Primary Examiner*—Arthur T. Grimley
*Attorney, Agent, or Firm*—William Freedman; J. Wesley Haubner

[57] ABSTRACT

A cable splice for joining together two or more sections of high voltage cable employs for its primary insulation a rigid, closed-cell foam having a thick integral skin bordering all the external surfaces of the foam and located in regions of the splice where electrical stresses are the highest. The skin has an average density greater than 40 pounds per cubic foot in its outer one-sixteenth inch.

7 Claims, 2 Drawing Figures

INSULATION OF AN OIL-IMPREGNATED PAPER OR OF A POLYOLEFIN

THICK-SKINNED FOAMED RESIN

HIGH VOLTAGE CABLE SPLICE USING FOAM INSULATION WITH THICK INTEGRAL SKIN IN HIGHLY STRESSED REGIONS

BACKGROUND

This invention relates to a cable splice for joining together two or more sections of high voltage cable and, more particularly, relates to a splice of this type that employs for its primary insulation a rigid, closed-cell foam having a thick integral skin bordering the external surfaces of the foam and located in the regions of the splice where electric stresses are highest.

Each of the cable sections that are joined together in our splice comprises a conductor, electrical insulation surrounding the conductor, and a tubular metal sheath surrounding said insulation. The conductor has an exposed end extending beyond the end of the insulation, and the insulation has an exposed end extending beyond the end of the sheath. Surrounding the exposed ends of the conductors, the insulation, and the sheaths, is a tubular section of solid insulant which forms the primary insulation of the splice.

Heretofore, this tubular section of solid insulant has typically been formed by the careful application of insulating tape or by molding the insulant in situ. Each of these procedures requires a considerable amount of skill for its successful performance and is subject to the additional disadvantage that the resulting insulant often will contain voids that can give rise to serious corona problems. Also, molding usually requires the application of heat and pressure and relatively expensive materials and equipment.

SUMMARY

An object of our invention is to utilize for the primary insulant of the cable splice a material which can be easily and inexpensively formed in place and is not highly sensitive to the presence of voids.

Still another object is to utilize for the insulant of the cable splice an inexpensive rigid, closed-cell insulating foam which has exceptional ability to resist dielectric breakdown in the regions of the splice that are most highly electrically stressed.

In carrying out our invention in one form, we utilize for the primary insulation of the splice a rigid, closed-cell foam of a special type that is characterized by having a thick integral skin bordering all its external surfaces. More specifically, this foam is of a type that is formed from constituents that when reacted in a mold to produce a foam body having an overall density of 15 lbs./ft.$^3$ will produce a foam body having at all its surfaces in contact with the mold a thick integral skin having an average density of at least 40 lbs./ft.$^3$ in its outer 1/16 inch. This insulation is foamed in place within the splice so that the surfaces of the splice exposed to the foam act as a mold therefor, thus providing the thick integral skin in the region of said foam that borders all of said exposed surfaces. This integral skin that is present in the splice has a density of at least 40 lbs./ft.$^3$ in its outer 1/16 inch.

BRIEF DESCRIPTION OF DRAWINGS

For a better understanding of the invention, reference may be had to following specification taken in conjunction with the accompanying drawing, wherein.

DETAILED DESCRIPTION OF PREFERRED EMBODIMENT

Figure 1:
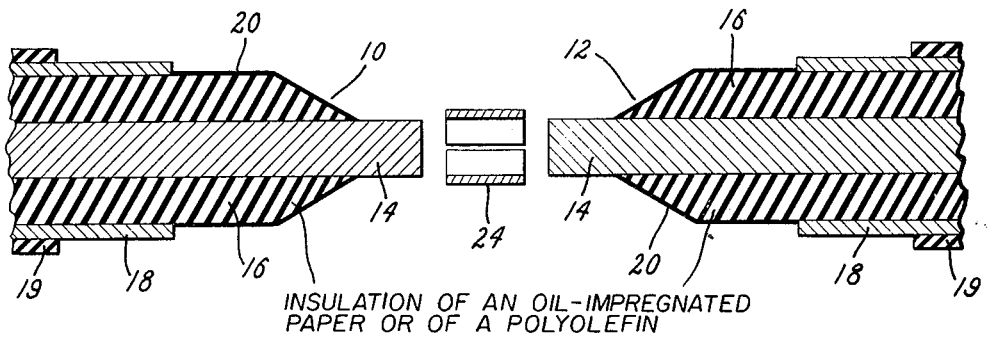
FIG. 1 is a sectional view showing two cable sections that are to be joined together by a splice embodying one form of our invention.

Referring now to FIG. 1, the two cable sections that are to be joined together are designated 10 and 12. Since these cable sections are substantially identical, identical reference numerals are used for corresponding parts of each. Each cable section comprises a conductor 14, insulation 16 surrounding the conductor, and a tubular metal sheath 18 surrounding the insulation 16. Sheath 18 can be either of a sheet or braided construction. A suitable protective covering 19 of non-metallic material surrounds the sheath 18. Each cable section, as seen in FIG. 1, has been prepared for formation of the splice by removal of insulation 16 from its end to provide an exposed conductor end portion, by removal of some of the metal sheath 18 to provide exposed insulation 16 projecting past the end of the metal sheath, and by removal of some of the protective covering 19 to expose the end of metal sheath 18. The end of the insulation 16 is preferably formed into a tapered configuration, as illustrated in FIG. 1. If the insulation 16 is of oil-impregnated paper, its exposed surfaces are coated with a suitable sealer to provide a thin sealing layer 20 that serves to prevent seepage of oil from the insulation and serves also to provide high affinity with the insulant to be applied later. In one embodiment, this sealing layer 20 takes the form of a layer of silicone tape. If the insulation 16 is of a conventional plastic material (e.g., one of the polyolefins such as polyethylene or polypropylene), it can be left bare. Preferably, however, a polyolefin is primed for bonding by pretreating its exposed surface with a corona discharge or by brushing on a suitable primer such as that available from Swift Chemical Company, Chicago, Ill., as its Foam-Bond No. 78.

The ends of conductors 14 of the two cable sections are then brought together, and, in a conventional manner, a tubular metal coupling 24 in the form of a split sleeve, is crimped about the exposed conductor ends to form a good electrical and mechanical joint therebetween.

The resulting assembly is then placed in a housing 26, which is preferably of metal. This housing 26 has hollow end portions 27 surrounding the sheaths 18 and in electrical contact therewith. In one embodiment of the invention, housing 26 is a lead cylinder having its hollow end portions sweated to the sheaths 18, which are also of lead. In a modified embodiment, housing 26 is of an insulating material, e.g., a glass-fibre-reinforced polyester resin. When an insulating material is used for the housing, the housing should be lined with metal serving as an electrical connection between the sheaths 18, or a suitable ground strap should be used for interconnecting the sheaths.

Figure 2:
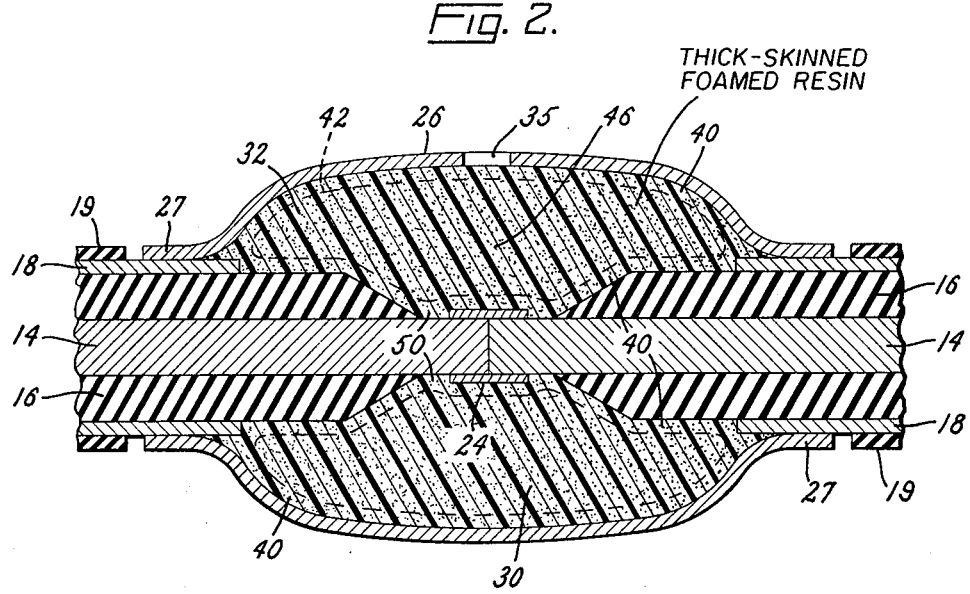
FIG. 2 is a sectional view of a cable splice joining the two cable sections of FIG. 1.

Housing 26 contains a cavity 30, which when the housing is positioned as shown in FIG. 2, encompasses the ends of the tubular metal sheaths 18 and also the exposed cable structure located between these spaced-apart ends of sheaths 18. In the completed splice, this cavity 30 is filled with a rigid, closed-cell foam 32 of a resin such as polyurethane that has its cells filled with a high dielectric strength gas that served as the blowing agent for the foam during its preparation. A preferred gas is a fluorocarbon such as $CFCl_3$, referred to hereinafter as Freon 11. The foam 32 is prepared by first mixing together its constituents in a location exterior to the housing 26 and then introducing the resulting mixture into the cavity 30 through a suitable port 35 in the housing 26. Shortly thereafter, the constituents react to form the resulting foam, which rapidly expands to fill the cavity 30. Suitable vents (not shown) are provided in the housing 26 to allow all air displaced during foaming to escape from cavity 30. These vents and the fill port preferably are suitably sealed after the foaming operation has been completed and after sufficient additional time has been allowed for the foam to cure.

Prior to the above-described foaming operation, all exposed surfaces of the parts of the splice located within cavity 30 are suitably freed of dirt, grease, and moisture so that intimate contact, and preferably a good bond, are developed between the foamed resin and these surfaces when the foamed resin expands into contact with the surfaces.

An important feature of our invention is that the foam used for the insulant 32 is a special foam of the type which forms a thick integral skin along its entire border that contacts the exposed surfaces of the splice parts. This thick integral skin covers the exposed end portions of the sheath 18, the exposed surfaces of the cable insulation 16, and the exposed surfaces of conductor portions 14, 24. This thick integral skin is depicted at 40 in FIG. 2, where a dotted line 42 represents its approximate inner boundary.

Perhaps the most appropriate way of defining this special type foam is by reference to its properties under certain assumed conditions. More specifically, this foam is of a type that is formed from constituents that when reacted in a closed mold of 4 inches by 4 inches by 2 inches to produce a foam body having an overall density of 15 lbs./ft.$^3$, will produce a foam body having at all its surfaces in contact with the mold a thick integral skin having an average density of at least 40 lbs./ft.$^3$ in its outer 1/16 inch.

An example of a suitable resin system of this type that when foamed provides such a thick integral skin on all exposed mold surfaces is the polyurethane resin system available from Reichhold Chemical Co., White Plains, N.Y., as its 90-646/34-841 Polylite Structural Foam System (with a 7 to 8 lbs./ft.$^3$ free rise density). When a sufficient amount of this resin system is introduced into a mold of the assumed size to provide a foam body having an overall density of 15 lbs./ft.$^3$, there will be formed on all mold surfaces exposed to the foam a thick integral skin that has an average density of 45 to 55 lbs./ft.$^3$ in its outer 1/16 inch. The core of this foam body will have a relatively low density of 7–10 lbs./ft.$^3$. Generally speaking, substantially the same skin and core densities will be obtained for any similar mold size, assuming the same overall density of the foam.

When this latter resin system is introduced into the cavity of our splice and reacted to form a foam body of 15 lbs./ft.$^3$ overall density, the thick integral skin 40 of FIG. 2 has an average density of 45 to 55 lbs./ft.$^3$ in its outer 1/16 inch. If larger quantities of the resin system are introduced so as to increase the overall density of the foam, slightly more dense skins will be formed having greater thicknesses.

Another suitable resin system is the polyurethane resin system sold by Rubicon Chemicals Inc. of Naugatuck, Conn. as its Rubicast RIA841 system. Using Freon 11 introduced in liquid form as a blowing agent for this system, a foam of substantially the same properties as the previously-described one has been obtained.

The foams that we refer to as thick integral-skin foams are quite different from the usual or standard type foams. A typical standard foam formed in a closed mold of the same size as referred to above (i.e., 4 × 4 × 2 inches) will have a denser outer-surface region than its core region; but comparing foams of the same overall density, the standard foam will have an average density in its outer 1/16 inch only about one-half or less that of the integral thick-skin foam, assuming an overall density of less than 25 pounds per ft$^3$. The standard foam has a denser core than a thick integral-skin foam of the same overall density, and there is therefore a much steeper average density gradient in the thick integral-skin foam, as considered between the outer surface and the core. The standard foam may develop a thick skin in localized surface regions, especially in the region adjacent the original location of the starting materials; but in more distant locations there will be only a very thin skin. The typical thick integral-skin foam is characterized by a skin having much more uniformity in thickness and density at all surface locations.

As a specific example of the above-described properties of a standard foam, a 15 lbs./ft.$^3$ standard foam, foamed in a closed mold 4 × 4 × 2 inches under ambient conditions and using conventional mixing techniques, has an average density in its outer 1/16 inch of only 20–25 lbs./ft.$^3$ and a core density of 10–12 lbs./ft.$^3$. As pointed out hereinabove, a thick integral-skin foam with the same overall density of 15 lbs./ft.$^3$ foamed in the same mold has a density of 45–55 lbs./ft.$^3$ in its outer 1/16 inch and a core density of only 7–10 lbs./ft.$^3$. An example of such a standard foam is the polyurethane system marketed by Upjohn Co., Torrance, Calif., as its type CPR 727 system with Freon 11 added for 15 lbs./ft.$^3$ final mold density.

While it is possible to achieve average densities above 40 lbs./ft.$^3$ in the outer 1/16 inch of standard foams by increasing the overall density of the foam, this approach has some significant disadvantages as compared to our use of thick integral-skin foams for achieving such skin densities. One disadvantage is that the standard foam, when so used, would be more costly because of the need to use much greater amounts of starting material. The greater amounts of starting material also lead to handling difficulties and to considerably higher weights. Still further, with the greater amounts of starting material, one is forced to limit the amount of fluorocarbon blowing agent to very small values, and if this is done, there is a greater likelihood that the fluorocarbon gas in the cells of the foam will have its dielectric strength reduced by the presence therein of air and carbon dioxide.

Returning now to our splice of FIG. 2, the thick integral skin 40 has a considerably higher dielectric strength and a considerably higher dielectric constant than the foam material in the core region 46. This higher dielectric strength is of special importance in the regions immediately adjacent the high voltage conductor structure 14, 24 and immediately adjacent the free ends of the sheath 18, which are regions of relatively high electric stress. The localized region 50 where the tapered end surface of insulation 16 intersects the conductor 14 is usually the region of highest electrical stress, and this region, it is noted, is heavily and intimately covered by the dense thick skin 40 of high dielectric strength to inhibit corona inception.

The core region of the foam has an appreciably lower dielectric constant than the material of insulation 16. For example, if insulation 16 is paper-oil, it will have a dielectric constant of about 3.6. If insulation 16 is of polyethylene, it will have a dielectric constant of about 2.3. But the foam in its core region, assuming a density of about 10 lbs./ft.$^3$, has a dielectric constant of about 1.2. The thick skin, however, has a considerably higher dielectric constant than the core, (e.g., about 2.0, assuming a density of 50 lbs./ft.$^3$). The closer match of dielectric constants resulting from the presence of the dense, thick skin 40 produces less refraction of the equipotential lines of the electric field as they pass through the interface region between insulation 16 and insulant 32, as compared with a standard foam of the same overall density. This reduces electric field distortions at this interface, thus reducing the likelihood of a resultant dielectric breakdown as a result of such field distortions.

Another factor that we believe contributes to the higher dielectric strength of our foam as compared to the standard foam is the steeper density gradient, and hence the steeper dielectric-constant gradient, between the skin and core of the foam.

It is a generally-held concept that voids in electrical insulation are dielectrically detrimental. This is certainly true of insulation that contains scattered voids, or holes, that are few in number. But when there are an extremely large number of tiny closely-spaced voids distributed generally uniformly and generally parallel to the high voltage conductor, as is the case with the dense foam immediately surrounding the conductive structure 14, 24 in our splice, the dielectric strength is far less affected by the voids. In general, the electric field is not distorted by such voids. Moreover the dielectric strength of the material is enhanced by the presence of high dielectric strength gas, such as $CFCl_3$, in the voids. Hence, despite the voids in the foam insulant 32, a very high dielectric strength is obtained with our cable splice. Since our splice can be made without the great care heretofore needed (with taped or molded splices) to minimize voids in the splice insulation, it is much less expensive than taped or molded splices and can be made quicker and with less skilled labor.

Although not mentioned hereinabove, it is to be understood that the high voltage conductor 14, 24 can be covered with a suitable semi-conductive material, e.g., a layer of semi-conductive tape, to reduce the likelihood of corona being initiated as a result of voids at the conductor surface caused by surface irregularities. Also, it will sometimes be useful to apply semi-conductive material to the surfaces of insulation 16 to help grade the voltage therealong. If such a coating is applied, it may be thought of as part of the electrical insulation 16.

Although we show only two conductors joined together at the splice, it is to be understood that our invention in its broader aspects comprehends a joint wherein more than two conductors are joined together (e.g., in a Y, X, or T configuration), and the insulant thereabout is a foamed-in-place thick integral-skin foam corresponding to the above described foam 32.

While we have shown and described a particular embodiment of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. A splice for joining two sections of high voltage cable, each comprising: a conductor adapted to operate at a high voltage with respect to ground, electrical insulation surrounding the conductor, and a tubular metal sheath normally at ground potential surrounding said insulation, the conductor having an exposed end extending beyond the end of said insulation and the insulation having an exposed end extending beyond the end of said sheath; said splice comprising:
   a. means for electrically and mechanically joining the exposed ends of the two conductors,
   b. a housing normally at substantially ground potential surrounding the adjacent ends of said cable sections and providing a cavity that surrounds the adjacent ends of said sheaths, said exposed insulation ends, and said conductor ends,
   c. a tubular section of insulant filling said cavity and in intimate contact with the cable parts within said cavity that are exposed to said insulant, said tubular section of insulant serving as primary insulation in said splice for withstanding voltage between said high voltage conductors and said grounded housing,
   d. said insulant being a rigid closed-cell foam of the type that is formed from constituents that when reacted in a mold 4 inches by 4 inches by 2 inches to produce a foam body having an overall density of 15 pounds/ft.$^3$, will produce a foam body having at all its surfaces in contact with the mold a thick integral skin having an average density of at least 40 pounds/ft.$^3$ in its outer 1/16 inch,
   e. said tubular section of insulant being foamed in place within said cavity so that the surfaces of the splice exposed to said foam and located within said cavity act as a mold therefor, thus providing a thick integral skin in the region of said tubular section that borders all of said exposed surfaces,
   f. the integral skin on said tubular section of insulant having an average density of at least 40 pounds/ft.$^3$ in its outer 1/16 inch.

2. The splice of claim 1 in which said foam is of a polyurethane resin having its cells filled with a fluorocarbon gas.

3. The splice of claim 1 in which said closed cells are filled with a fluorocarbon gas.

4. The splice of claim 1 in which said electrical insulation surrounding at least one of said conductors is of paper impregnated with oil.

5. The splice of claim 2 in which said electrical insulation surrounding at least one of said conductors is of paper impregnated with oil.

6. The splice of claim 1 in which said electrical insulation surrounding at least one of said conductors is a polyolefin.

7. The splice of claim 2 in which said electrical insulation surrounding at least one of said conductors is a polyolefin.

* * * * *